United States Patent
Zhou et al.

(10) Patent No.: US 11,323,226 B2
(45) Date of Patent: May 3, 2022

(54) METHOD FOR ALLOCATING CONTROL RESOURCE SET, METHOD FOR ACQUIRING CONTROL RESOURCE SET, BASE STATION, USER EQUIPMENT AND READABLE MEDIUM

(71) Applicant: SPREADTRUM COMMUNICATIONS (SHANGHAI) CO., LTD., Shanghai (CN)

(72) Inventors: Huayu Zhou, Shanghai (CN); Yanan Jia, Shanghai (CN); Shaofei Wang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 66 days.

(21) Appl. No.: 16/859,232

(22) Filed: Apr. 27, 2020

(65) Prior Publication Data

US 2020/0259620 A1 Aug. 13, 2020

Related U.S. Application Data (63) Continuation of application No. 16/059,427, filed on Aug. 9, 2018, now Pat. No. 10,680,779.

(30) Foreign Application Priority Data

Aug. 11, 2017 (CN) .......................... 201710689594.5

(51) Int. Cl.
*H04L 5/00* (2006.01)
*H04W 56/00* (2009.01)
(Continued)

(52) U.S. Cl.
CPC .......... *H04L 5/0053* (2013.01); *H04L 5/0048* (2013.01); *H04L 5/0082* (2013.01);
(Continued)

(58) Field of Classification Search
CPC ... H04L 5/0053; H04L 5/0048; H04L 5/0082; H04L 5/0091; H04L 27/2602;
(Continued)

(56) References Cited

U.S. PATENT DOCUMENTS

2015/0215908 A1 7/2015 Seo et al.
2018/0324843 A1* 11/2018 Lee ...................... H04L 5/0053
(Continued)

FOREIGN PATENT DOCUMENTS

| CN | 106385709 A | 2/2017 |
|---|---|---|
| WO | 2014035217 A2 | 3/2014 |

OTHER PUBLICATIONS

U.S. Non-Final Office Action corresponding to U.S. Appl. No. 16/059,427, dated Sep. 18, 2019.
CNIPA First Office Action for corresponding CN Application No. 201710689594.5, dated Nov. 3, 2020.
(Continued)

*Primary Examiner* — Kyaw Z Soe
(74) *Attorney, Agent, or Firm* — Cantor Colburn LLP (57) ABSTRACT

Method for allocating CORESET, method for acquiring CORESET, base station, UE and readable mediums are provided. The method for allocating CORESET includes: configuring time position information of at least one CORESET, the time position information including the number of symbols occupied by the at least one CORESET and a start position of the at least one CORESET, the symbols including symbols in a numerology used by the at least one CORESET; configuring position information of the at least one CORESET in a system frame number; and transmitting the time position information and the position information of the at least one CORESET to the UE, so that the UE selects the start position of the at least one CORESET based on the time position information and the position information. The base station doesn't need to directly indicate the CORESET, which reduces overhead of signaling indicating CORESET.

21 Claims, 3 Drawing Sheets

(51) Int. Cl.
*H04W 72/04* (2009.01)
*H04W 16/28* (2009.01)
*H04L 27/26* (2006.01)

(52) U.S. Cl.
CPC ........ *H04L 5/0091* (2013.01); *H04L 27/2602* (2013.01); *H04W 16/28* (2013.01); *H04W 56/001* (2013.01); *H04W 72/042* (2013.01); *H04W 72/0446* (2013.01)

(58) Field of Classification Search
CPC ........... H04L 27/26025; H04L 5/0094; H04W 16/28; H04W 56/001; H04W 72/042; H04W 72/0446; H04W 72/0453
See application file for complete search history.

(56) References Cited

U.S. PATENT DOCUMENTS

2019/0052434 A1    2/2019  Zhou
2019/0150110 A1*   5/2019  Ko ....................... H04J 11/0069
                                                          370/350

OTHER PUBLICATIONS

LG Electronics, "Discussion on CORESET configuration", 3GPP TSG RAN WG1 Meeting #89; Hangzhou, China May 15-19, 2017; R1-1707626; 5 pages.
ETRI, "Discussion on configuration of search space and CORESET"; 3GPP TSG RAN WG1 #89; Hangzhou, China, May 15-19, 2017; R1-1708100; 3 pages.

* cited by examiner

FIG. 1 a UE receives configuration information from a base station, wherein the configuration information includes time position information of at least one CORESET, and position information of the at least one CORESET in an SFN, wherein the time position information includes: the number of symbols occupied by the at least one CORESET, or the number of symbols occupied by the at least one CORESET and a start position of the at least one CORESET, wherein the symbols include symbols in a numerology used by the at least one CORESET ⎯⎯ S201 the start position of the at least one CORESET is selected based on the configuration information, and a preset table of relation between the number of symbols occupied by the CORESET and the start position of the CORESET ⎯⎯ S202

METHOD FOR ALLOCATING CONTROL RESOURCE SET, METHOD FOR ACQUIRING CONTROL RESOURCE SET, BASE STATION, USER EQUIPMENT AND READABLE MEDIUM

CROSS-REFERENCE TO RELATED APPLICATIONS

The present application is a Continuation Application of the U.S. patent application Ser. No. 16/059,427 filed on Aug. 9, 2018 and which claims priority to Chinese patent application No. 201710689594.5, filed on Aug. 11, 2017, the entire disclosures of both of which are incorporated herein by reference and priority to both of which is claimed hereby also.

TECHNICAL FIELD

The present disclosure generally relates to communication field, and more particularly, to a method for allocating a control resource set, a method for acquiring a control resource set, a base station, a user equipment and a readable medium.

BACKGROUND

In a 5G system, a User Equipment (UE) in an idle state needs to monitor a Physical Downlink Control Channel (PDCCH) and blindly detect the PDCCH in a common search space to acquire Downlink Control Information (DCI) therein, so as to receive common control messages, such as Remaining Minimum System Information (RMSI) or paging messages, in a Physical Downlink Shared Channel (PDSCH) indicated by the DCI. Time-frequency resources corresponding to the PDCCH to be monitored by the UE in the idle state are referred to as a Control Resource Set (CORESET).

A base station sends a Master Information Block (MIB) in a Physical Broadcast Channel (PBCH) to indicate a first CORESET the UE needs to monitor in the idle state, so that the UE blindly detects a PDCCH in the first CORESET to acquire information such as RMSI when in the idle state. Further, the RMSI further indicates a second CORESET to be monitored by the UE in the idle state, so that the UE may blindly detect a PDCCH in the second CORESET in the idle state to acquire paging messages or the like. The first CORESET and the second CORESET are collectively referred to as an idle CORESET.

In specific product implementation, a base station at a network deploys the idle CORESET based on an application scenario, and sends the idle CORESET to a UE through signaling, so that the UE monitors a PDCCH on the configured idle CORESET after searching cells. Currently, the idle CORESET is directly indicated by signaling. When the signaling indicating the idle CORESET is large, signaling overhead of the network is large accordingly.

SUMMARY

By embodiments of the present disclosure, overhead of signaling indicating a CORESET may be reduced.

In an embodiment of the present disclosure, a method for allocating CORESET is provided, including: configuring time position information of at least one CORESET, wherein the time position information includes: the number of symbols occupied by the at least one CORESET, or the number of symbols occupied by the at least one CORESET and a start position of the at least one CORESET, wherein the symbols include symbols in a numerology used by the at least one CORESET; configuring position information of the at least one CORESET in a System Frame Number (SFN); and transmitting the time position information and the position information of the at least one CORESET to a UE, so that the UE selects the start position of the at least one CORESET based on the time position information and the position information of the at least one CORESET, and a preset table of relation between the number of symbols occupied by the CORESET and the start position of the CORESET.

Optionally, the at least one CORESET includes time-frequency resources corresponding to a PDCCH to be monitored by the UE in an idle state.

Optionally, the preset table of relation between the number of symbols occupied by the CORESET and the start position of the CORESET includes: to a system with a subcarrier spacing of 15 kHz or 30 kHz and with a time resource pattern corresponding to pattern 2, if the number of symbols occupied by each of the at least one CORESET is one, and the number of the at least one CORESET is two, time positions including: the zeroth and the first symbols of a zeroth slot, or the zeroth and the sixth symbols of the zeroth slot, or the zeroth and the first symbols of a first slot, or the zeroth and the sixth symbols of the first slot; if the number of symbols occupied by each of the at least one CORESET is one, and the number of the at least one CORESET is one, time positions including: the zeroth symbol of the zeroth slot, or the zeroth symbol of the first slot; if the number of symbols occupied by each of the at least one CORESET is two, and the number of the at least one CORESET is two, time positions including: the zeroth, the first, the sixth and the seventh symbols of the zeroth slot, or the zeroth, the first, the sixth and the seventh symbols of the first slot; and if the number of symbols occupied by each of the at least one CORESET is two, and the number of the at least one CORESET is one, time positions including: the zeroth and the first symbols of the zeroth slot, and the zeroth and the first symbols of the first slot.

Optionally, the preset table of relation between the number of symbols occupied by the CORESET and the start position of the CORESET includes: to a system with a subcarrier spacing of 120 kHz or 30 kHz and with a time resource pattern corresponding to pattern 1, if the number of symbols occupied by each of the at least one CORESET is one, and the number of the at least one CORESET is two, time positions including: the zeroth and the first symbols of a zeroth slot, or the zeroth and the third symbols of the zeroth slot, or the zeroth and the first symbols of a first slot; if the number of symbols occupied by each of the at least one CORESET is one, and the number of the at least one CORESET is one, time positions including: the zeroth symbol of the zeroth slot, or the zeroth symbol of the first slot; if the number of symbols occupied by each of the at least one CORESET is two, and the number of the at least one CORESET is two, time positions including: the zeroth, the first, the second and the third symbols of the zeroth slot, or the twelfth and the thirteenth symbols of the zeroth slot and the zeroth and the first symbols of the first slot; and if the number of symbols occupied by each of the at least one CORESET is two, and the number of the at least one CORESET is one, time positions including: the zeroth and the first symbols of the zeroth slot, or the zeroth and the first symbols of the first slot.

Optionally, the preset table of relation between the number of symbols occupied by the CORESET and the start position of the CORESET includes: to a system with a subcarrier spacing of 240 kHz, if the number of symbols occupied by each of the at least one CORESET is one, and the number of the at least one CORESET is four, time positions including: the zeroth, the first, the second and the third symbols of a zeroth slot, or the zeroth, the second, the fourth and the sixth symbols of the zeroth slot, or the zeroth, the first, the second and the third symbols of a second slot; if the number of symbols occupied by each of the at least one CORESET is one, and the number of the at least one CORESET is two, time positions including: the zeroth and the first symbols of the zeroth slot, and the zeroth and the first symbols of the second slot; if the number of symbols occupied by each of the at least one CORESET is two, and the number of the at least one CORESET is four, time positions including: the zeroth, the first, the second, the third, the fourth, the fifth, the sixth and the seventh symbols of the zeroth slot, or the tenth, the eleventh, the twelfth and the thirteenth symbols of a first slot and the zeroth, the first, the second and the third symbols of the second slot; and if the number of symbols occupied by each of the at least one CORESET is two, and the number of the at least one CORESET is two, time positions including: the zeroth, the first, the second and the third symbols of the zeroth slot, or the zeroth, the first, the second and the third symbols of the second slot.

Optionally, the start position indicates a position of a first symbol in the CORESET, and the number of the at least one CORESET in one, two or four slots.

Optionally, a time position indicated by the time position information is a time position of the at least one CORESET in one, two or four slots.

Optionally, configuring position information of the at least one CORESET in an SFN includes: configuring a period of a CORESET burst set to be N times of a period of a synchronization signal burst set, wherein N is a positive integer, and the CORESET burst set consists of all CORESETs which complete one round of beam sweeping or consists of all CORESETs specified within a monitoring period of the UE; and configuring an offset between a start time of the CORESET burst set and a start time of the synchronization signal burst set to be zero.

Optionally, the time position information and the position information of the at least one CORESET are transmitted to the UE through MIB or RMSI.

In an embodiment of the present disclosure, a method for acquiring CORESET is provided, including: a UE receiving configuration information from a base station, wherein the configuration information includes time position information of at least one CORESET, and position information of the at least one CORESET in an SFN, wherein the time position information includes: the number of symbols occupied by the at least one CORESET, or the number of symbols occupied by the at least one CORESET and a start position of the at least one CORESET, wherein the symbols include symbols in a numerology used by the at least one CORESET; and selecting the start position of the at least one CORESET based on the configuration information, and a preset table of relation between the number of symbols occupied by the CORESET and the start position of the CORESET.

Optionally, the at least one CORESET includes time-frequency resources corresponding to a PDCCH to be monitored by the UE in an idle state.

Optionally, the preset table of relation between the number of symbols occupied by the CORESET and the start position of the CORESET includes: to a system with a subcarrier spacing of 15 kHz or 30 kHz and with a time resource pattern corresponding to pattern 2, if the number of symbols occupied by each of the at least one CORESET is one, and the number of the at least one CORESET is two, time positions including: the zeroth and the first symbols of a zeroth slot, or the zeroth and the sixth symbols of the zeroth slot, or the zeroth and the first symbols of a first slot, or the zeroth and the sixth symbols of the first slot; if the number of symbols occupied by each of the at least one CORESET is one, and the number of the at least one CORESET is one, time positions including: the zeroth symbol of the zeroth slot, or the zeroth symbol of the first slot; if the number of symbols occupied by each of the at least one CORESET is two, and the number of the at least one CORESET is two, time positions including: the zeroth, the first, the sixth and the seventh symbols of the zeroth slot, or the zeroth, the first, the sixth and the seventh symbols of the first slot; and if the number of symbols occupied by each of the at least one CORESET is two, and the number of the at least one CORESET is one, time positions including: the zeroth and the first symbols of the zeroth slot, and the zeroth and the first symbols of the first slot.

Optionally, the preset table of relation between the number of symbols occupied by the CORESET and the start position of the CORESET includes: to a system with a subcarrier spacing of 120 kHz or 30 kHz and with a time resource pattern corresponding to pattern 1, if the number of symbols occupied by each of the at least one CORESET is one, and the number of the at least one CORESET is two, time positions including: the zeroth and the first symbols of a zeroth slot, or the zeroth and the third symbols of the zeroth slot, or the zeroth and the first symbols of a first slot; if the number of symbols occupied by each of the at least one CORESET is one, and the number of the at least one CORESET is one, time positions including: the zeroth symbol of the zeroth slot, or the zeroth symbol of the first slot; if the number of symbols occupied by each of the at least one CORESET is two, and the number of the at least one CORESET is two, time positions including: the zeroth, the first, the second and the third symbols of the zeroth slot, or the twelfth and the thirteenth symbols of the zeroth slot and the zeroth and the first symbols of the first slot; and if the number of symbols occupied by each of the at least one CORESET is two, and the number of the at least one CORESET is one, time positions including: the zeroth and the first symbols of the zeroth slot, or the zeroth and the first symbols of the first slot.

Optionally, the preset table of relation between the number of symbols occupied by the CORESET and the start position of the CORESET includes: to a system with a subcarrier spacing of 240 kHz, if the number of symbols occupied by each of the at least one CORESET is one, and the number of the at least one CORESET is four, time positions including: the zeroth, the first, the second and the third symbols of a zeroth slot, or the zeroth, the second, the fourth and the sixth symbols of the zeroth slot, or the zeroth, the first, the second and the third symbols of a second slot; if the number of symbols occupied by each of the at least one CORESET is one, and the number of the at least one CORESET is two, time positions including: the zeroth and the first symbols of the zeroth slot, and the zeroth and the first symbols of the second slot; if the number of symbols occupied by each of the at least one CORESET is two, and the number of the at least one CORESET is four, time positions including: the zeroth, the first, the second, the third, the fourth, the fifth, the sixth and the seventh symbols of the zeroth slot, or the tenth, the eleventh, the twelfth and the thirteenth symbols of a first slot and the zeroth, the first, the second and the third symbols of the second slot; and if the number of symbols occupied by each of the at least one CORESET is two, and the number of the at least one CORESET is two, time positions including: the zeroth, the first, the second and the third symbols of the zeroth slot, or the zeroth, the first, the second and the third symbols of the second slot.

Optionally, the start position indicates a position of a first symbol in the CORESET, and the number of the at least one CORESET in one, two or four slots.

Optionally, a time position indicated by the time position information is a time position of the at least one CORESET in one, two or four slots.

Optionally, the position information of the at least one CORESET in the SFN includes: a period of a CORESET burst set being N times of a period of a synchronization signal burst set, wherein N is a positive integer, and the CORESET burst set consists of all CORESETs which complete one round of beam sweeping or consists of all CORESETs specified within a monitoring period of the UE; and an offset between a start time of the CORESET burst set and a start time of the synchronization signal burst set being zero.

Optionally, the configuration information is received from the base station through MIB or RMSI.

Optionally, the method may further include: receiving Demodulation Reference Signal (DMRS) on the at least one CORESET to perform time-frequency tracking.

In an embodiment of the present disclosure, a base station is provided, including: a configuring circuitry which includes a first configuring sub-circuitry and a second configuring sub-circuitry, wherein the first configuring sub-circuitry is configured to configure time position information of at least one CORESET, wherein the time position information includes: the number of symbols occupied by the at least one CORESET, or the number of symbols occupied by the at least one CORESET and a start position of the at least one CORESET, wherein the symbols include symbols in a numerology used by the at least one CORESET; wherein the second configuring sub-circuitry is configured to configure position information of the at least one CORESET in an SFN; and a transmitting circuitry configured to transmit the time position information and the position information of the at least one CORESET to a UE, so that the UE selects the start position of the at least one CORESET based on the time position information and the position information of the at least one CORESET, and a preset table of relation between the number of symbols occupied by the CORESET and the start position of the CORESET.

Optionally, the at least one CORESET includes time-frequency resources corresponding to a PDCCH to be monitored by the UE in an idle state.

Optionally, the preset table of relation between the number of symbols occupied by the CORESET and the start position of the CORESET includes: to a system with a subcarrier spacing of 15 kHz or 30 kHz and with a time resource pattern corresponding to pattern 2, if the number of symbols occupied by each of the at least one CORESET is one, and the number of the at least one CORESET is two, time positions including: the zeroth and the first symbols of a zeroth slot, or the zeroth and the sixth symbols of the zeroth slot, or the zeroth and the first symbols of a first slot, or the zeroth and the sixth symbols of the first slot; if the number of symbols occupied by each of the at least one CORESET is one, and the number of the at least one CORESET is one, time positions including: the zeroth symbol of the zeroth slot, or the zeroth symbol of the first slot; if the number of symbols occupied by each of the at least one CORESET is two, and the number of the at least one CORESET is two, time positions including: the zeroth, the first, the sixth and the seventh symbols of the zeroth slot, or the zeroth, the first, the sixth and the seventh symbols of the first slot; and if the number of symbols occupied by each of the at least one CORESET is two, and the number of the at least one CORESET is one, time positions including: the zeroth and the first symbols of the zeroth slot, and the zeroth and the first symbols of the first slot.

Optionally, the preset table of relation between the number of symbols occupied by the CORESET and the start position of the CORESET includes: to a system with a subcarrier spacing of 120 kHz or 30 kHz and with a time resource pattern corresponding to pattern 1, if the number of symbols occupied by each of the at least one CORESET is one, and the number of the at least one CORESET is two, time positions including: the zeroth and the first symbols of a zeroth slot, or the zeroth and the third symbols of the zeroth slot, or the zeroth and the first symbols of a first slot; if the number of symbols occupied by each of the at least one CORESET is one, and the number of the at least one CORESET is one, time positions including: the zeroth symbol of the zeroth slot, or the zeroth symbol of the first slot; if the number of symbols occupied by each of the at least one CORESET is two, and the number of the at least one CORESET is two, time positions including: the zeroth, the first, the second and the third symbols of the zeroth slot, or the twelfth and the thirteenth symbols of the zeroth slot and the zeroth and the first symbols of the first slot; and if the number of symbols occupied by each of the at least one CORESET is two, and the number of the at least one CORESET is one, time positions including: the zeroth and the first symbols of the zeroth slot, or the zeroth and the first symbols of the first slot.

Optionally, the preset table of relation between the number of symbols occupied by the CORESET and the start position of the CORESET includes: to a system with a subcarrier spacing of 240 kHz, if the number of symbols occupied by each of the at least one CORESET is one, and the number of the at least one CORESET is four, time positions including: the zeroth, the first, the second and the third symbols of a zeroth slot, or the zeroth, the second, the fourth and the sixth symbols of the zeroth slot, or the zeroth, the first, the second and the third symbols of a second slot; if the number of symbols occupied by each of the at least one CORESET is one, and the number of the at least one CORESET is two, time positions including: the zeroth and the first symbols of the zeroth slot, and the zeroth and the first symbols of the second slot; if the number of symbols occupied by each of the at least one CORESET is two, and the number of the at least one CORESET is four, time positions including: the zeroth, the first, the second, the third, the fourth, the fifth, the sixth and the seventh symbols of the zeroth slot, or the tenth, the eleventh, the twelfth and the thirteenth symbols of a first slot and the zeroth, the first, the second and the third symbols of the second slot; and if the number of symbols occupied by each of the at least one CORESET is two, and the number of the at least one CORESET is two, time positions including: the zeroth, the first, the second and the third symbols of the zeroth slot, or the zeroth, the first, the second and the third symbols of the second slot.

Optionally, the start position indicates a position of a first symbol in the CORESET, and the number of the at least one CORESET in one, two or four slots.

Optionally, a time position indicated by the time position information is a time position of the at least one CORESET in one, two or four slots.

Optionally, the second configuring sub-circuitry is configured to: configure a period of a CORESET burst set to be N times of a period of a synchronization signal burst set, wherein N is a positive integer, and the CORESET burst set consists of all CORESETs which complete one round of beam sweeping or consists of all CORESETs specified within a monitoring period of the UE; and configure an offset between a start time of the CORESET burst set and a start time of the synchronization signal burst set to be zero.

Optionally, the transmitting circuitry is configured to transmit the time position information and the position information of the at least one CORESET to the UE through MIB or RMSI.

In an embodiment of the present disclosure, a UE is provided, including: a first receiving circuitry, configured to receive configuration information from a base station, wherein the configuration information includes time position information of at least one CORESET, and position information of the at least one CORESET in an SFN, wherein the time position information includes: the number of symbols occupied by the at least one CORESET, or the number of symbols occupied by the at least one CORESET and a start position of the at least one CORESET, wherein the symbols include symbols in a numerology used by the at least one CORESET; and an acquiring circuitry, configured to select the start position of the at least one CORESET based on the configuration information, and a preset table of relation between the number of symbols occupied by the CORESET and the start position of the CORESET.

Optionally, the at least one CORESET includes time-frequency resources corresponding to a PDCCH to be monitored by the UE in an idle state.

Optionally, the preset table of relation between the number of symbols occupied by the CORESET and the start position of the CORESET includes: to a system with a subcarrier spacing of 15 kHz or 30 kHz and with a time resource pattern corresponding to pattern 2, if the number of symbols occupied by each of the at least one CORESET is one, and the number of the at least one CORESET is two, time positions including: the zeroth and the first symbols of a zeroth slot, or the zeroth and the sixth symbols of the zeroth slot, or the zeroth and the first symbols of a first slot, or the zeroth and the sixth symbols of the first slot; if the number of symbols occupied by each of the at least one CORESET is one, and the number of the at least one CORESET is one, time positions including: the zeroth symbol of the zeroth slot, or the zeroth symbol of the first slot; if the number of symbols occupied by each of the at least one CORESET is two, and the number of the at least one CORESET is two, time positions including: the zeroth, the first, the sixth and the seventh symbols of the zeroth slot, or the zeroth, the first, the sixth and the seventh symbols of the first slot; and if the number of symbols occupied by each of the at least one CORESET is two, and the number of the at least one CORESET is one, time positions including: the zeroth and the first symbols of the zeroth slot, and the zeroth and the first symbols of the first slot.

Optionally, the preset table of relation between the number of symbols occupied by the CORESET and the start position of the CORESET includes: to a system with a subcarrier spacing of 120 kHz or 30 kHz and with a time resource pattern corresponding to pattern 1, if the number of symbols occupied by each of the at least one CORESET is one, and the number of the at least one CORESET is two, time positions including: the zeroth and the first symbols of a zeroth slot, or the zeroth and the third symbols of the zeroth slot, or the zeroth and the first symbols of a first slot; if the number of symbols occupied by each of the at least one CORESET is one, and the number of the at least one CORESET is one, time positions including: the zeroth symbol of the zeroth slot, or the zeroth symbol of the first slot; if the number of symbols occupied by each of the at least one CORESET is two, and the number of the at least one CORESET is two, time positions including: the zeroth, the first, the second and the third symbols of the zeroth slot, or the twelfth and the thirteenth symbols of the zeroth slot and the zeroth and the first symbols of the first slot; and if the number of symbols occupied by each of the at least one CORESET is two, and the number of the at least one CORESET is one, time positions including: the zeroth and the first symbols of the zeroth slot, or the zeroth and the first symbols of the first slot.

Optionally, the preset table of relation between the number of symbols occupied by the CORESET and the start position of the CORESET includes: to a system with a subcarrier spacing of 240 kHz, if the number of symbols occupied by each of the at least one CORESET is one, and the number of the at least one CORESET is four, time positions including: the zeroth, the first, the second and the third symbols of a zeroth slot, or the zeroth, the second, the fourth and the sixth symbols of the zeroth slot, or the zeroth, the first, the second and the third symbols of a second slot; if the number of symbols occupied by each of the at least one CORESET is one, and the number of the at least one CORESET is two, time positions including: the zeroth and the first symbols of the zeroth slot, and the zeroth and the first symbols of the second slot; if the number of symbols occupied by each of the at least one CORESET is two, and the number of the at least one CORESET is four, time positions including: the zeroth, the first, the second, the third, the fourth, the fifth, the sixth and the seventh symbols of the zeroth slot, or the tenth, the eleventh, the twelfth and the thirteenth symbols of a first slot and the zeroth, the first, the second and the third symbols of the second slot; and if the number of symbols occupied by each of the at least one CORESET is two, and the number of the at least one CORESET is two, time positions including: the zeroth, the first, the second and the third symbols of the zeroth slot, or the zeroth, the first, the second and the third symbols of the second slot.

Optionally, the start position indicates a position of a first symbol in the CORESET, and the number of the at least one CORESET in one, two or four slots.

Optionally, a time position indicated by the time position information is a time position of the at least one CORESET in one, two or four slots.

Optionally, the position information of the at least one CORESET in the SFN includes: a period of a CORESET burst set being N times of a period of a synchronization signal burst set, wherein N is a positive integer, and the CORESET burst set consists of all CORESETs which complete one round of beam sweeping or consists of all CORESETs specified within a monitoring period of the UE; and an offset between a start time of the CORESET burst set and a start time of the synchronization signal burst set being zero.

Optionally, the first receiving circuitry is configured to receive the configuration information from the base station through MIB or RMSI.

Optionally, the UE may further include a second receiving circuitry, configured to receive DMRS on the at least one CORESET to perform time-frequency tracking.

In an embodiment of the present disclosure, a computer readable medium which has computer instructions stored therein is provided, wherein once the computer instructions are executed, the method for allocating CORESET is performed.

In an embodiment of the present disclosure, a computer readable medium which has computer instructions stored therein is provided, wherein once the computer instructions are executed, the method for acquiring CORESET is performed.

In an embodiment of the present disclosure, a base station is provided, including a memory and a processor, wherein the memory has computer instructions stored therein, and once executing the computer instructions, the processor performs the method for allocating CORESET.

In an embodiment of the present disclosure, a UE is provided, including a memory and a processor, wherein the memory has computer instructions stored therein, and once executing the computer instructions, the processor performs the method for acquiring CORESET.

Embodiments of the present disclosure may provide following advantages. A table of relation between the number of symbols occupied by the CORESET and the start position of the CORESET is preset. The base station only needs to configure the time position information of CORESET and the position information of the CORESET in the SFN, without directly indicating the CORESET, which may effectively reduce overhead of signaling indicating a CORESET.

Further, the UE may receive DMRS on the start position of the CORESET to perform time-frequency tracking, which may improve time-frequency tracking performance of the UE.

DETAILED DESCRIPTION

In specific product implementation, a base station at a network deploys an idle CORESET based on an application scenario, and sends the idle CORESET to a UE through signaling, so that the UE monitors a PDCCH on the configured idle CORESET after searching cells. Currently, the idle CORESET is directly indicated by signaling. When the signaling indicating the idle CORESET is large, signaling overhead of the network is large.

In embodiments of the present disclosure, a table of relation between the number of symbols occupied by the CORESET and the start position of the CORESET is preset. The base station only transmits necessary configuration information to the UE based on the table without directly indicating the CORESET to the UE, which may effectively reduce overhead of signaling indicating a CORESET.

In order to clarify the object, solutions and advantages of embodiments of the present disclosure, embodiments of the present disclosure will be described clearly in detail in conjunction with accompanying drawings.

Figure 1:
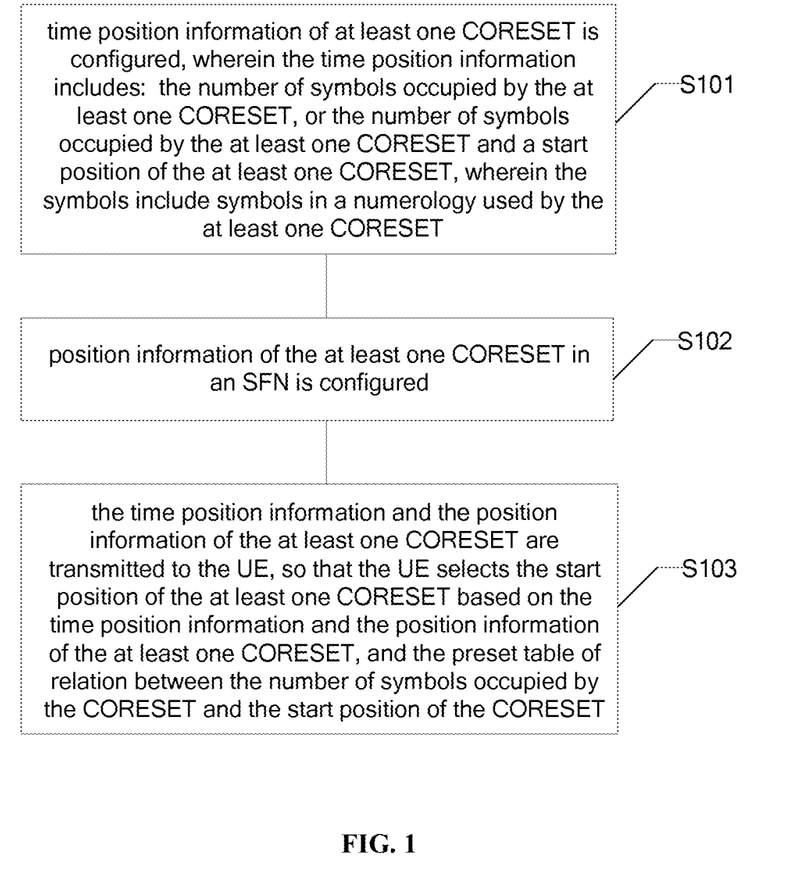
FIG. 1 schematically illustrates a flow chart of a method for allocating CORESET according to an embodiment.

FIG. 1 schematically illustrates a flow chart of a method for allocating CORESET according to an embodiment. Referring to FIG. 1, the method includes S101, S102 and S103.

In S101, time position information of at least one CORESET is configured, wherein the time position information includes: the number of symbols occupied by the at least one CORESET, or the number of symbols occupied by the at least one CORESET and a start position of the at least one CORESET, wherein the symbols include symbols in a numerology used by the at least one CORESET.

In some embodiments, the at least one CORESET includes time-frequency resources corresponding to a PDCCH to be monitored by the UE in an idle state. Time-frequency resources include time resources and frequency resources. In some embodiments, the time resources corresponding to the PDCCH to be monitored by the UE include both PDCCH monitoring occasion and time duration of the PDCCH.

In some embodiments, a time position indicated by the time position information is a time position of the at least one CORESET in one, two or four slots.

In some embodiments, the symbols include symbols in a numerology used by the at least one CORESET, but not symbols in a numerology used by a synchronization signal block.

In some embodiments, to effectively reduce overhead of signaling indicating the CORESET, a table of relation between the number of symbols occupied by the CORESET and the start position of the CORESET may be preset. The base station only needs to configure the number of symbols occupied by the CORESET, and the UE can select the start position of the CORESET configured by the base station based on the preset table of relation between the number of symbols occupied by the CORESET and the start position of the CORESET.

In some embodiments, the number of symbols occupied by the CORESET may correspond to multiple time positions of the CORESET. In this case, an actual start position of the CORESET is indicated in the start position of the CORESET.

In some embodiments, the start position indicates a position of a first symbol in the CORESET, and the number of the at least one CORESET in one, two or four slots.

The UE is capable of selecting the start position of the CORESET in the one, two or four slots based on the start position, the number of symbols occupied by the CORESET, and the preset table of relation between the number of symbols occupied by the CORESET and the start position of the CORESET.

In S102, position information of the at least one CORESET in an SFN is configured.

In some embodiments, based on the configured time position information, and the preset table of relation between the number of symbols occupied by the CORESET and the start position of the CORESET, the UE can acquire the start position of the CORESET in one, two or four slots, but cannot acquire a position of the CORESET in the SFN. Therefore, the position information of the at least one CORESET in the SFN needs to be configured.

In some embodiments, a period of a CORESET burst set is configured to be N times of a period of a synchronization signal burst set, wherein N is a positive integer, and the CORESET burst set consists of all CORESETs which complete one round of beam sweeping or consists of all CORE- SETs specified within a monitoring period of the UE. An offset between a start time of the CORESET burst set and a start time of the synchronization signal burst set is configured to be zero.

In some embodiments, the CORESET may be associated with a synchronization signal block within one, two or four time slots by default, wherein the association relation means that the CORESET and the synchronization signal block use the same transmitting beam. In the association relation, one CORESET may correspond to one synchronization signal block, or two synchronization signal blocks. By associating the CORESET with the synchronization signal block, when transmitting to the UE a time position of actually transmitting a synchronization signal block, the UE can calculate an actual time position of the CORSET. Afterward, the UE may only need to listen to a channel at the actual time position of the CORESET.

In S103, the time position information and the position information of the at least one CORESET are transmitted to the UE, so that the UE selects the start position of the at least one CORESET based on the time position information and the position information of the at least one CORESET, and the preset table of relation between the number of symbols occupied by the CORESET and the start position of the CORESET.

In some embodiments, the time position information and the position information of the at least one CORESET are transmitted to the UE through MIB or RMSI. In some embodiments, these configuration information may be transmitted to the UE through other information.

In some embodiments, the table of relation between the number of symbols occupied by the CORESET and the start position of the CORESET is preset, so that the UE can select the start position of the at least one CORESET based on the time position information and the position information of the at least one CORESET, and the preset table of relation between the number of symbols occupied by the CORESET and the start position of the CORESET.

In some embodiments, the table of relation between the number of symbols occupied by the CORESET and the start position of the CORESET is shown as Table 1.

TABLE 1

| the number of symbols occupied by the CORESET | the number of the CORESETs | time position of the zeroth slot | time position of the first slot |
|---|---|---|---|
| 1 | 2 | the zeroth and the first symbols, or the zeroth and the sixth symbols | the zeroth and the first symbols, or the zeroth and the sixth symbols |
|  | 1 | the zeroth symbol | the zeroth symbol |
| 2 | 2 | the zeroth, the first, the sixth and the seventh symbols | the zeroth, the first, the sixth and the seventh symbols |
|  | 1 | the zeroth and the first symbols | the zeroth and the first symbols |

Referring to Table 1, to a system with a subcarrier spacing of 15 kHz or 30 kHz and with a time resource pattern corresponding to pattern 2, the relation between the number of symbols occupied by the CORESET and the start position of the CORESET may include following cases. The pattern 2 includes: one slot (corresponding to fourteen symbols) including two synchronization signal blocks, where the second to the fifth symbols are the first synchronization signal block, and the eighth to the eleventh symbols are the second synchronization signal block.

If the number of symbols occupied by each of the at least one CORESET is one, and the number of the at least one CORESET is two, time positions include: the zeroth and the first symbols of a zeroth slot, or the zeroth and the sixth symbols of the zeroth slot, or the zeroth and the first symbols of a first slot, or the zeroth and the sixth symbols of the first slot.

If the number of symbols occupied by each of the at least one CORESET is one, and the number of the at least one CORESET is one, time positions including: the zeroth symbol of the zeroth slot, or the zeroth symbol of the first slot.

If the number of symbols occupied by each of the at least one CORESET is two, and the number of the at least one CORESET is two, time positions including: the zeroth, the first, the sixth and the seventh symbols of the zeroth slot, or the zeroth, the first, the sixth and the seventh symbols of the first slot.

If the number of symbols occupied by each of the at least one CORESET is two, and the number of the at least one CORESET is one, time positions including: the zeroth and the first symbols of the zeroth slot, and the zeroth and the first symbols of the first slot.

In some embodiments, the table of relation between the number of symbols occupied by the CORESET and the start position of the CORESET is shown as Table 2.

TABLE 2

| the number of symbols occupied by the CORESET | the number of the CORESETs | time position of the zeroth slot | time position of the first slot |
|---|---|---|---|
| 1 | 2 | the zeroth and the first symbols, or the zeroth and the third symbols | the zeroth and the first symbols |
|  | 1 | the zeroth symbol | the zeroth symbol |
| 2 | 2 | the zeroth, the first, the second and the third symbols | the twelfth and the thirteenth symbols of the zeroth slot, and the zeroth and the first symbols of the first slot |
|  | 1 | the zeroth and the first symbols | the zeroth and the first symbols |

Referring to Table 2, to a system with a subcarrier spacing of 120 kHz or 30 kHz and with a time resource pattern corresponding to pattern 1, the relation between the number of symbols occupied by the CORESET and the start position of the CORESET may include following cases. The pattern 1 includes: two slots (each occupying fourteen symbols) including four synchronization signal blocks, where the fourth to the seventh symbols in the zeroth slot are the first synchronization signal block, the eighth to the eleventh symbols in the zeroth slot are the second synchronization signal block, the second to the fifth symbols in the first slot are the third synchronization signal block, and the sixth to the ninth symbols in the first slot are the fourth synchronization signal block.

If the number of symbols occupied by each of the at least one CORESET is one, and the number of the at least one CORESET is two, time positions including: the zeroth and the first symbols of a zeroth slot, or the zeroth and the third symbols of the zeroth slot, or the zeroth and the first symbols of a first slot.

If the number of symbols occupied by each of the at least one CORESET is one, and the number of the at least one CORESET is one, time positions including: the zeroth symbol of the zeroth slot, or the zeroth symbol of the first slot.

If the number of symbols occupied by each of the at least one CORESET is two, and the number of the at least one CORESET is two, time positions including: the zeroth, the first, the second and the third symbols of the zeroth slot, or the twelfth and the thirteenth symbols of the zeroth slot and the zeroth and the first symbols of the first slot.

If the number of symbols occupied by each of the at least one CORESET is two, and the number of the at least one CORESET is one, time positions including: the zeroth and the first symbols of the zeroth slot, or the zeroth and the first symbols of the first slot.

In some embodiments, the table of relation between the number of symbols occupied by the CORESET and the start position of the CORESET is shown as Table 3.

TABLE 3

| the number of symbols occupied by the CORESET | the number of the CORESETs | time position of the zeroth/first slot | time position of the second/third slot |
| --- | --- | --- | --- |
| 1 | 4 | the zeroth, the first, the second and the third symbols of the zeroth slot, or the zeroth, the second, the fourth and the sixth symbols of the zeroth slot | the zeroth, the first, the second and the third symbols of the second slot |
|   | 2 | the zeroth and the first symbols of the zeroth slots | the zeroth and the first symbols of the second slots |
| 2 | 4 | the zeroth, the first, the second, the third, the fourth, the fifth, the sixth and the seventh symbols of the zeroth slot | the tenth, the eleventh, the twelfth and the thirteenth symbols of the first slot, and the zeroth, the first, the second and the third symbols of the second slot |
|   | 2 | the zeroth, the first, the second and the third symbols of the zeroth slot | the zeroth, the first, the second and the third symbols of the second slot |

Referring to Table 3, to a system with a subcarrier spacing of 240 kHz, four slots (each occupying fourteen symbols) include eight synchronization signal blocks. The eighth to the eleventh symbols in the zeroth slot are the first synchronization signal block, the twelfth to the thirteenth symbols in the zeroth slot and the zeroth to the first slots in the first slot are the second synchronization signal block, the second to the fifth symbols in the first slot are the third synchronization signal block, the sixth to the ninth symbols in the first slot are the fourth synchronization signal block, the fourth to the seventh symbols in the second slot are the fifth synchronization signal block, the eighth to the eleventh symbols in the second slot are the sixth synchronization signal block, the twelfth to the thirteenth symbols in the second slot and the zeroth to the first slots in the third slot are the seventh synchronization signal block, and the second to the fifth symbols in the third slot are the eighth synchronization signal block. The relation between the number of symbols occupied by the CORESET and the start position of the CORESET may include following cases.

If the number of symbols occupied by each of the at least one CORESET is one, and the number of the at least one CORESET is four, time positions including: the zeroth, the first, the second and the third symbols of a zeroth slot, or the zeroth, the second, the fourth and the sixth symbols of the zeroth slot, or the zeroth, the first, the second and the third symbols of a second slot.

If the number of symbols occupied by each of the at least one CORESET is one, and the number of the at least one CORESET is two, time positions including: the zeroth and the first symbols of the zeroth slot, and the zeroth and the first symbols of the second slot.

If the number of symbols occupied by each of the at least one CORESET is two, and the number of the at least one CORESET is four, time positions including: the zeroth, the first, the second, the third, the fourth, the fifth, the sixth and the seventh symbols of the zeroth slot, or the tenth, the eleventh, the twelfth and the thirteenth symbols of a first slot and the zeroth, the first, the second and the third symbols of the second slot.

If the number of symbols occupied by each of the at least one CORESET is two, and the number of the at least one CORESET is two, time positions including: the zeroth, the first, the second and the third symbols of the zeroth slot, or the zeroth, the first, the second and the third symbols of the second slot.

In above embodiments, the table of relation between the number of symbols occupied by the CORESET and the start position of the CORESET is preset. The base station only needs to configure the time position information of CORESET and the position information of the CORESET in the SFN, without directly indicating the CORESET, which may effectively reduce overhead of signaling indicating a CORESET.

Figure 2:
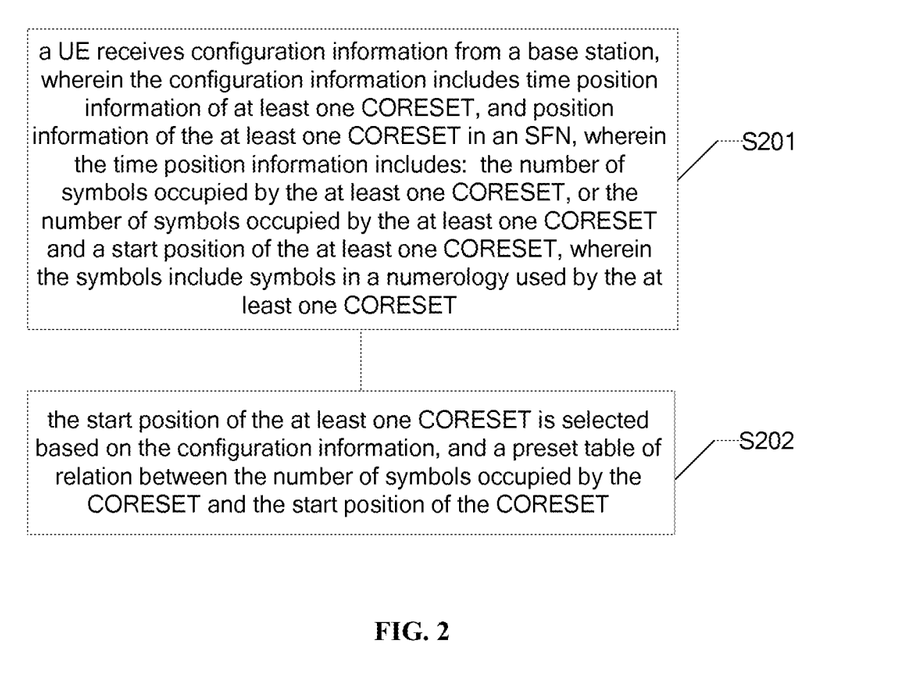
FIG. 2 schematically illustrates a flow chart of a method for acquiring CORESET according to an embodiment.

To make those skilled in the art better understand and implement solutions of the present disclosure, embodiments of the present disclosure also provide a method for acquiring CORESET. Referring to FIG. 2, the method may include S201 and S202.

In S201, a UE receives configuration information from a base station, wherein the configuration information includes time position information of at least one CORESET, and position information of the at least one CORESET in an SFN, wherein the time position information includes: the number of symbols occupied by the at least one CORESET, or the number of symbols occupied by the at least one CORESET and a start position of the at least one CORESET, wherein the symbols include symbols in a numerology used by the at least one CORESET.

In some embodiments, the at least one CORESET includes time-frequency resources corresponding to a PDCCH to be monitored by the UE in an idle state. Time-frequency resources include time resources and frequency resources. In some embodiments, the time resources corresponding to the PDCCH to be monitored by the UE include both PDCCH monitoring occasion and time duration of the PDCCH.

In some embodiments, the symbols include symbols in a numerology used by the at least one CORESET, but not symbols in a numerology used by a synchronization signal block.

In some embodiments, the configuration information is received through MIB or RMSI. In some embodiments, the configuration information may be received through other information.

In some embodiments, a time position indicated by the time position information is a time position of the at least one CORESET in one, two or four slots.

In some embodiments, to effectively reduce overhead of signaling indicating a CORESET, the table of relation between the number of symbols occupied by the CORESET and the start position of the CORESET is preset. After receiving the number of symbols occupied by the CORESET, the UE acquires the start position of the at least one CORESET based on the preset table of relation between the number of symbols occupied by the CORESET and the start position of the CORESET.

In some embodiments, the number of symbols occupied by the CORESET may correspond to multiple time positions of the CORESET. In this case, an actual start position of the CORESET is indicated in the start position of the CORESET.

In some embodiments, the start position indicates a position of a first symbol in the CORESET, and the number of the at least one CORESET in one, two or four slots.

The UE is capable of selecting the start position of the CORESET in the one, two or four slots based on the start position, the number of symbols occupied by the CORESET, and the preset table of relation between the number of symbols occupied by the CORESET and the start position of the CORESET.

In some embodiments, based on the configured time position information, and the preset table of relation between the number of symbols occupied by the CORESET and the start position of the CORESET, the UE can acquire the start position of the CORESET in one, two or four slots, but cannot acquire a position of the CORESET in the SFN. Therefore, the position information of the at least one CORESET in the SFN needs to be acquired.

In some embodiments, a CORESET burst set and a synchronization signal burst set may be configured to be associated with each other by the base station. A period of the CORESET burst set is configured to be N times of a period of the synchronization signal burst set, wherein N is a positive integer, and the CORESET burst set consists of all CORESETs which complete one round of beam sweeping or consists of all CORESETs specified within a monitoring period of the UE. An offset between a start time of the CORESET burst set and a start time of the synchronization signal burst set is configured to be zero.

In some embodiments, the CORESET may be associated with a synchronization signal block within one, two or four time slots by default, wherein the association relation means that the CORESET and the synchronization signal block use the same transmitting beam. In the association relation, one CORESET may correspond to one synchronization signal block, or two synchronization signal blocks. By associating the CORESET with the synchronization signal block, when transmitting to the UE a time position of actually transmitting a synchronization signal block, the UE can calculate an actual time position of the CORSET. Afterward, the UE may only need to listen to a channel at the actual time position of the CORESET.

In S202, the start position of the at least one CORESET is selected based on the configuration information, and a preset table of relation between the number of symbols occupied by the CORESET and the start position of the CORESET.

In some embodiments, the table of relation between the number of symbols occupied by the CORESET and the start position of the CORESET is preset, so that the UE can select the start position of the at least one CORESET based on the configuration information, and the preset table of relation between the number of symbols occupied by the CORESET and the start position of the CORESET.

In some embodiments, to a system with a subcarrier spacing of 15 kHz or 30 kHz and with a time resource pattern corresponding to pattern 2, the preset table of relation between the number of symbols occupied by the CORESET and the start position of the CORESET may include following cases.

If the number of symbols occupied by each of the at least one CORESET is one, and the number of the at least one CORESET is two, time positions include: the zeroth and the first symbols of a zeroth slot, or the zeroth and the sixth symbols of the zeroth slot, or the zeroth and the first symbols of a first slot, or the zeroth and the sixth symbols of the first slot.

If the number of symbols occupied by each of the at least one CORESET is one, and the number of the at least one CORESET is one, time positions including: the zeroth symbol of the zeroth slot, or the zeroth symbol of the first slot.

If the number of symbols occupied by each of the at least one CORESET is two, and the number of the at least one CORESET is two, time positions including: the zeroth, the first, the sixth and the seventh symbols of the zeroth slot, or the zeroth, the first, the sixth and the seventh symbols of the first slot.

If the number of symbols occupied by each of the at least one CORESET is two, and the number of the at least one CORESET is one, time positions including: the zeroth and the first symbols of the zeroth slot, and the zeroth and the first symbols of the first slot.

In some embodiments, to a system with a subcarrier spacing of 120 kHz or 30 kHz and with a time resource pattern corresponding to pattern 1, the preset table of relation between the number of symbols occupied by the CORESET and the start position of the CORESET may include following cases.

If the number of symbols occupied by each of the at least one CORESET is one, and the number of the at least one CORESET is two, time positions including: the zeroth and the first symbols of a zeroth slot, or the zeroth and the third symbols of the zeroth slot, or the zeroth and the first symbols of a first slot.

If the number of symbols occupied by each of the at least one CORESET is one, and the number of the at least one CORESET is one, time positions including: the zeroth symbol of the zeroth slot, or the zeroth symbol of the first slot.

If the number of symbols occupied by each of the at least one CORESET is two, and the number of the at least one CORESET is two, time positions including: the zeroth, the first, the second and the third symbols of the zeroth slot, or the twelfth and the thirteenth symbols of the zeroth slot and the zeroth and the first symbols of the first slot.

If the number of symbols occupied by each of the at least one CORESET is two, and the number of the at least one CORESET is one, time positions including: the zeroth and the first symbols of the zeroth slot, or the zeroth and the first symbols of the first slot.

In some embodiments, to a system with a subcarrier spacing of 240 kHz, the preset table of relation between the number of symbols occupied by the CORESET and the start position of the CORESET may include following cases.

If the number of symbols occupied by each of the at least one CORESET is one, and the number of the at least one CORESET is four, time positions including: the zeroth, the first, the second and the third symbols of a zeroth slot, or the zeroth, the second, the fourth and the sixth symbols of the zeroth slot, or the zeroth, the first, the second and the third symbols of a second slot.

If the number of symbols occupied by each of the at least one CORESET is one, and the number of the at least one CORESET is two, time positions including: the zeroth and the first symbols of the zeroth slot, and the zeroth and the first symbols of the second slot.

If the number of symbols occupied by each of the at least one CORESET is two, and the number of the at least one CORESET is four, time positions including: the zeroth, the first, the second, the third, the fourth, the fifth, the sixth and the seventh symbols of the zeroth slot, or the tenth, the eleventh, the twelfth and the thirteenth symbols of a first slot and the zeroth, the first, the second and the third symbols of the second slot.

If the number of symbols occupied by each of the at least one CORESET is two, and the number of the at least one CORESET is two, time positions including: the zeroth, the first, the second and the third symbols of the zeroth slot, or the zeroth, the first, the second and the third symbols of the second slot.

In some embodiments, the UE may further receive DMRS on an actual time position of the at least one CORESET to perform time-frequency tracking, which may improve time-frequency tracking performance of the UE.

To make those skilled in the art better understand and implement solutions of the present disclosure, embodiments of the present disclosure provide a base station for performing the above method for allocating CORESET.

Figure 3:
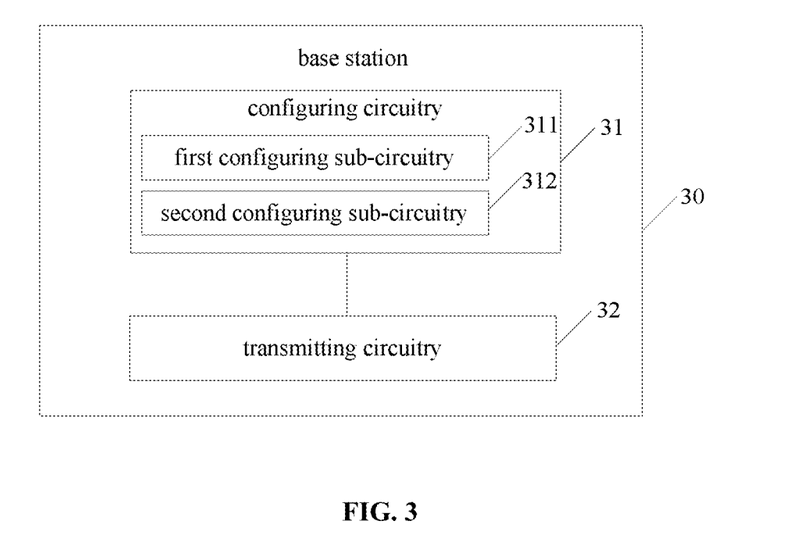
FIG. 3 schematically illustrates a structural diagram of a base station according to an embodiment.

Referring to FIG. 3, the base station 30 includes a configuring circuitry 31 and a transmitting circuitry 32.

The configuring circuitry 31 is configured to configure information of at least one CORESET, and includes a first configuring sub-circuitry 311 and a second configuring sub-circuitry 312. The first configuring sub-circuitry 311 is configured to configure time position information of the at least one CORESET, wherein the time position information includes: the number of symbols occupied by the at least one CORESET, or the number of symbols occupied by the at least one CORESET and a start position of the at least one CORESET, wherein the symbols include symbols in a numerology used by the at least one CORESET. The second configuring sub-circuitry 312 is configured to configure position information of the at least one CORESET in an SFN.

In some embodiments, the at least one CORESET includes time-frequency resources corresponding to a PDCCH to be monitored by the UE in an idle state. Time-frequency resources include time resources and frequency resources. In some embodiments, the time resources corresponding to the PDCCH to be monitored by the UE include both PDCCH monitoring occasion and time duration of the PDCCH.

The transmitting circuitry 32 is configured to transmit the configuration information of the at least one CORESET to the UE, so that the UE selects the start position of the at least one CORESET based on the time position information and the position information of the at least one CORESET, and a preset table of relation between the number of symbols occupied by the CORESET and the start position of the CORESET.

In some embodiments, the preset table of relation between the number of symbols occupied by the CORESET and the start position of the CORESET includes: to a system with a subcarrier spacing of 15 kHz or 30 kHz and with a time resource pattern corresponding to pattern 2, if the number of symbols occupied by each of the at least one CORESET is one, and the number of the at least one CORESET is two, time positions including: the zeroth and the first symbols of a zeroth slot, or the zeroth and the sixth symbols of the zeroth slot, or the zeroth and the first symbols of a first slot, or the zeroth and the sixth symbols of the first slot; if the number of symbols occupied by each of the at least one CORESET is one, and the number of the at least one CORESET is one, time positions including: the zeroth symbol of the zeroth slot, or the zeroth symbol of the first slot; if the number of symbols occupied by each of the at least one CORESET is two, and the number of the at least one CORESET is two, time positions including: the zeroth, the first, the sixth and the seventh symbols of the zeroth slot, or the zeroth, the first, the sixth and the seventh symbols of the first slot; and if the number of symbols occupied by each of the at least one CORESET is two, and the number of the at least one CORESET is one, time positions including: the zeroth and the first symbols of the zeroth slot, and the zeroth and the first symbols of the first slot.

In some embodiments, the preset table of relation between the number of symbols occupied by the CORESET and the start position of the CORESET includes: to a system with a subcarrier spacing of 120 kHz or 30 kHz and with a time resource pattern corresponding to pattern 1, if the number of symbols occupied by each of the at least one CORESET is one, and the number of the at least one CORESET is two, time positions including: the zeroth and the first symbols of a zeroth slot, or the zeroth and the third symbols of the zeroth slot, or the zeroth and the first symbols of a first slot; if the number of symbols occupied by each of the at least one CORESET is one, and the number of the at least one CORESET is one, time positions including: the zeroth symbol of the zeroth slot, or the zeroth symbol of the first slot; if the number of symbols occupied by each of the at least one CORESET is two, and the number of the at least one CORESET is two, time positions including: the zeroth, the first, the second and the third symbols of the zeroth slot, or the twelfth and the thirteenth symbols of the zeroth slot and the zeroth and the first symbols of the first slot; and if the number of symbols occupied by each of the at least one CORESET is two, and the number of the at least one CORESET is one, time positions including: the zeroth and the first symbols of the zeroth slot, or the zeroth and the first symbols of the first slot.

In some embodiments, the preset table of relation between the number of symbols occupied by the CORESET and the start position of the CORESET includes: to a system with a subcarrier spacing of 240 kHz, if the number of symbols occupied by each of the at least one CORESET is one, and the number of the at least one CORESET is four, time positions including: the zeroth, the first, the second and the third symbols of a zeroth slot, or the zeroth, the second, the fourth and the sixth symbols of the zeroth slot, or the zeroth, the first, the second and the third symbols of a second slot; if the number of symbols occupied by each of the at least one CORESET is one, and the number of the at least one CORESET is two, time positions including: the zeroth and the first symbols of the zeroth slot, and the zeroth and the first symbols of the second slot; if the number of symbols occupied by each of the at least one CORESET is two, and the number of the at least one CORESET is four, time positions including: the zeroth, the first, the second, the third, the fourth, the fifth, the sixth and the seventh symbols of the zeroth slot, or the tenth, the eleventh, the twelfth and the thirteenth symbols of a first slot and the zeroth, the first, the second and the third symbols of the second slot; and if the number of symbols occupied by each of the at least one CORESET is two, and the number of the at least one CORESET is two, time positions including: the zeroth, the first, the second and the third symbols of the zeroth slot, or the zeroth, the first, the second and the third symbols of the second slot.

In some embodiments, the start position indicates a position of a first symbol in the CORESET, and the number of the at least one CORESET in one, two or four slots.

In some embodiments, a time position indicated by the time position information is a time position of the at least one CORESET in one, two or four slots.

In some embodiments, the second configuring sub-circuitry 312 is configured to: configure a period of a CORESET burst set to be N times of a period of a synchronization signal burst set, wherein N is a positive integer, and the CORESET burst set consists of all CORESETs which complete one round of beam sweeping or consists of all CORESETs specified within a monitoring period of the UE; and configure an offset between a start time of the CORESET burst set and a start time of the synchronization signal burst set to be zero.

In some embodiments, the transmitting circuitry 32 is configured to transmit the time position information and the position information of the at least one CORESET to the UE through MIB or RMSI.

In an embodiment of the present disclosure, a computer readable medium which has computer instructions stored therein is provided, wherein once the computer instructions are executed, the above method for allocating CORESET is performed.

In an embodiment of the present disclosure, a base station is provided, including a memory and a processor, wherein the memory has computer instructions stored therein, and once executing the computer instructions, the processor performs the above method for allocating CORESET.

To make those skilled in the art better understand and implement solutions of the present disclosure, embodiments of the present disclosure provide a UE for performing the above method for acquiring CORESET.

Figure 4:
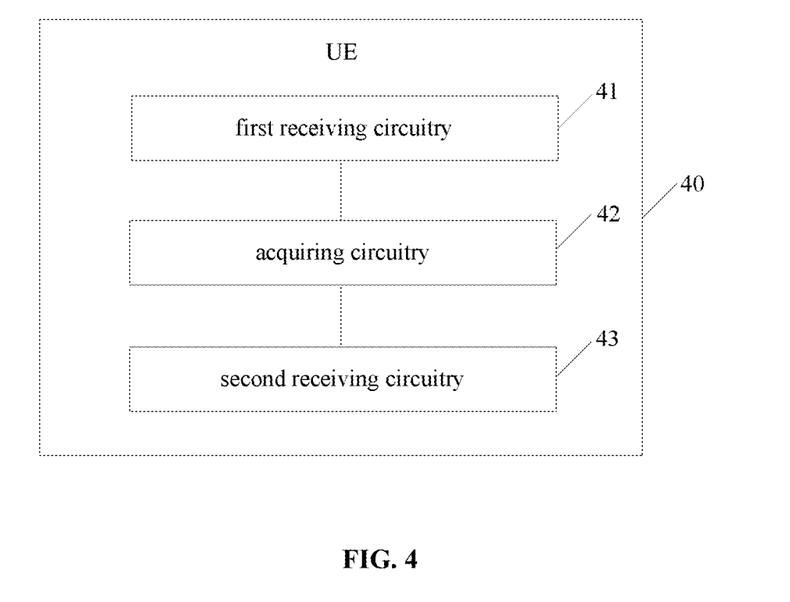
FIG. 4 schematically illustrates a structural diagram of a UE according to an embodiment.

Referring to FIG. 4, the UE 40 includes a first receiving circuitry 41 and an acquiring circuitry 42.

The first receiving circuitry 41 is configured to receive configuration information from a base station. The configuration information includes time position information of at least one CORESET, and position information of the at least one CORESET in an SFN. The at least one CORESET includes time-frequency resources corresponding to a PDCCH to be monitored by the UE in an idle state. The time position information include: the number of symbols occupied by the at least one CORESET, or the number of symbols occupied by the at least one CORESET and a start position of the at least one CORESET, wherein the symbols include symbols in a numerology used by the at least one CORESET.

The acquiring circuitry 42 is configured to select the start position of the at least one CORESET based on the configuration information, and a preset table of relation between the number of symbols occupied by the CORESET and the start position of the CORESET.

In some embodiments, the preset table of relation between the number of symbols occupied by the CORESET and the start position of the CORESET includes: to a system with a subcarrier spacing of 15 kHz or 30 kHz and with a time resource pattern corresponding to pattern 2, if the number of symbols occupied by each of the at least one CORESET is one, and the number of the at least one CORESET is two, time positions including: the zeroth and the first symbols of a zeroth slot, or the zeroth and the sixth symbols of the zeroth slot, or the zeroth and the first symbols of a first slot, or the zeroth and the sixth symbols of the first slot; if the number of symbols occupied by each of the at least one CORESET is one, and the number of the at least one CORESET is one, time positions including: the zeroth symbol of the zeroth slot, or the zeroth symbol of the first slot; if the number of symbols occupied by each of the at least one CORESET is two, and the number of the at least one CORESET is two, time positions including: the zeroth, the first, the sixth and the seventh symbols of the zeroth slot, or the zeroth, the first, the sixth and the seventh symbols of the first slot; and if the number of symbols occupied by each of the at least one CORESET is two, and the number of the at least one CORESET is one, time positions including: the zeroth and the first symbols of the zeroth slot, and the zeroth and the first symbols of the first slot.

In some embodiments, the preset table of relation between the number of symbols occupied by the CORESET and the start position of the CORESET includes: to a system with a subcarrier spacing of 120 kHz or 30 kHz and with a time resource pattern corresponding to pattern 1, if the number of symbols occupied by each of the at least one CORESET is one, and the number of the at least one CORESET is two, time positions including: the zeroth and the first symbols of a zeroth slot, or the zeroth and the third symbols of the zeroth slot, or the zeroth and the first symbols of a first slot; if the number of symbols occupied by each of the at least one CORESET is one, and the number of the at least one CORESET is one, time positions including: the zeroth symbol of the zeroth slot, or the zeroth symbol of the first slot; if the number of symbols occupied by each of the at least one CORESET is two, and the number of the at least one CORESET is two, time positions including: the zeroth, the first, the second and the third symbols of the zeroth slot, or the twelfth and the thirteenth symbols of the zeroth slot and the zeroth and the first symbols of the first slot; and if the number of symbols occupied by each of the at least one CORESET is two, and the number of the at least one CORESET is one, time positions including: the zeroth and the first symbols of the zeroth slot, or the zeroth and the first symbols of the first slot.

In some embodiments, the preset table of relation between the number of symbols occupied by the CORESET and the start position of the CORESET includes: to a system with a subcarrier spacing of 240 kHz, if the number of symbols occupied by each of the at least one CORESET is one, and the number of the at least one CORESET is four, time positions including: the zeroth, the first, the second and the third symbols of a zeroth slot, or the zeroth, the second, the fourth and the sixth symbols of the zeroth slot, or the zeroth, the first, the second and the third symbols of a second slot; if the number of symbols occupied by each of the at least one CORESET is one, and the number of the at least one CORESET is two, time positions including: the zeroth and the first symbols of the zeroth slot, and the zeroth and the first symbols of the second slot; if the number of symbols occupied by each of the at least one CORESET is two, and the number of the at least one CORESET is four, time positions including: the zeroth, the first, the second, the third, the fourth, the fifth, the sixth and the seventh symbols of the zeroth slot, or the tenth, the eleventh, the twelfth and the thirteenth symbols of a first slot and the zeroth, the first, the second and the third symbols of the second slot; and if the number of symbols occupied by each of the at least one CORESET is two, and the number of the at least one CORESET is two, time positions including: the zeroth, the first, the second and the third symbols of the zeroth slot, or the zeroth, the first, the second and the third symbols of the second slot.

In some embodiments, the start position indicates a position of a first symbol in the CORESET, and the number of the at least one CORESET in one, two or four slots.

In some embodiments, a time position indicated by the time position information is a time position of the at least one CORESET in one, two or four slots.

In some embodiments, the position information of the at least one CORESET in the SFN includes: a period of a CORESET burst set being N times of a period of a synchronization signal burst set, wherein N is a positive integer, and the CORESET burst set consists of all CORESETs which complete one round of beam sweeping or consists of all CORESETs specified within a monitoring period of the UE; and an offset between a start time of the CORESET burst set and a start time of the synchronization signal burst set being zero.

Optionally, the first receiving circuitry 41 is configured to receive the configuration information from the base station through MIB or RMSI.

Optionally, the UE may further include a second receiving circuitry 43, configured to receive DMRS on the at least one CORESET to perform time-frequency tracking.

It could be understood that, PDCCH, CORESET, PDSCH, RMSI and MIB are described in the above embodiments as examples. In other embodiments, other channels or signals which can implement similar functions are also possible, which falls in scope of the present disclosure.

In an embodiment of the present disclosure, a computer readable medium which has computer instructions stored therein is provided, wherein once the computer instructions are executed, the method for acquiring CORESET is performed.

In an embodiment of the present disclosure, a UE is provided, including a memory and a processor, wherein the memory has computer instructions stored therein, and once executing the computer instructions, the processor performs the method for acquiring CORESET.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for allocating Control Resource Set (CORESET), comprising:
configuring time position information of at least one CORESET, wherein the time position information comprises the number of symbols occupied by the at least one CORESET and a start position of the at least one CORESET, wherein the symbols comprises symbols in a numerology used by the at least one CORESET;
configuring position information of the at least one CORESET in a system frame number; and
transmitting the time position information and the position information of the at least one CORESET to a User Equipment (UE), so that the UE selects the start position of the at least one CORESET based on the time position information and the position information of the at least one CORESET.

2. The method according to claim 1, wherein the at least one CORESET comprises time-frequency resources corresponding to a PDCCH to be monitored by the UE in an idle state.

3. The method according to claim 1, wherein the at least one CORESET is associated with at least one synchronization signal block within one, two or four time slots.

4. The method according to claim 3, wherein the at least one CORESET and the at least one synchronization signal block use the same transmitting beam.

5. The method according to claim 3, wherein each of the at least one CORESET corresponds to one or two of the at least one synchronization signal block.

6. The method according to claim 1, wherein the start position indicates a position of a first symbol in the CORESET, and the number of the at least one CORESET in one, two or four slots.

7. The method according to claim 1, wherein a time position indicated by the time position information is a time position of the at least one CORESET in one, two or four slots.

8. The method according to claim 1, wherein configuring position information of the at least one CORESET in a system frame number comprises:
configuring a period of a CORESET burst set to be N times of a period of a synchronization signal burst set, wherein N is a positive integer, and the CORESET burst set consists of all CORESETs which complete one round of beam sweeping or consists of all CORESETs specified within a monitoring period of the UE; and
configuring an offset between a start time of the CORESET burst set and a start time of the synchronization signal burst set to be zero.

9. The method according to claim 1, wherein the time position information and the position information of the at least one CORESET are transmitted to the UE through Master Information Block (MIB) or Remaining Minimum System Information (RMSI).

10. A method for acquiring Control Resource Set (CORESET), comprising:
a User Equipment (UE) receiving configuration information from a base station, wherein the configuration information comprises time position information of at least one CORESET, and position information of the at least one CORESET in a system frame number, wherein the time position information comprises the number of symbols occupied by the at least one CORESET and a start position of the at least one CORESET, wherein the symbols comprises symbols in a numerology used by the at least one CORESET; and
selecting the start position of the at least one CORESET based on the configuration information.

11. The method according to claim 10, wherein the at least one CORESET comprises time-frequency resources corresponding to a PDCCH to be monitored by the UE in an idle state.

12. The method according to claim 10, wherein the at least one CORESET is associated with at least one synchronization signal block within one, two or four time slots.

13. The method according to claim 12, wherein the at least one CORESET and the at least one synchronization signal block use the same transmitting beam.

14. The method according to claim 12, wherein each of the at least one CORESET corresponds to one or two of the at least one synchronization signal block.

15. The method according to claim 10, wherein the start position indicates a position of a first symbol in the CORESET, and the number of the at least one CORESET in one, two or four slots.

16. The method according to claim 10, wherein a time position indicated by the time position information is a time position of the at least one CORESET in one, two or four slots.

17. The method according to claim 10, wherein the position information of the at least one CORESET in the system frame number comprises:
a period of a CORESET burst set being N times of a period of a synchronization signal burst set, wherein N is a positive integer, and the CORESET burst set consists of all CORESETs which complete one round of beam sweeping or consists of all CORESETs specified within a monitoring period of the UE; and an offset between a start time of the CORESET burst set and a start time of the synchronization signal burst set being zero.

18. The method according to claim 10, wherein the configuration information is received from the base station through Master Information Block (MIB) or Remaining Minimum System Information (RMSI).

19. The method according to claim 17, further comprising: receiving Demodulation Reference Signal (DMRS) on the at least one CORESET to perform time-frequency tracking.

20. A non-transitory tangible computer readable medium which has computer instructions stored therein, wherein once the computer instructions are executed by a processor, the method according to claim 1 is performed.

21. A non-transitory tangible computer readable medium which has computer instructions stored therein, wherein once the computer instructions are executed by a processor, a method for allocating Control Resource Set (CORESET) is performed, wherein the method comprises:
receiving configuration information from a base station, wherein the configuration information comprises time position information of at least one CORESET, and position information of the at least one CORESET in a system frame number, wherein the time position information comprises the number of symbols occupied by the at least one CORESET and a start position of the at least one CORESET, wherein the symbols comprises symbols in a numerology used by the at least one CORESET; and
selecting the start position of the at least one CORESET based on the configuration information.

* * * * *